United States Patent Office 3,314,902
Patented Apr. 18, 1967

3,314,902
STABILIZED MASTERBATCH FOR PREPARING
FIRE-RETARDANT POLYURETHANE FOAMS
Marco Wismer, Gibsonia, Herman P. Doerge, Verona,
Paul R. Mosso, Natrona Heights, and James F. Foote,
Sarver, Pa., assignors to Pittsburgh Plate Glass Company, Pittsburgh, Pa., a corporation of Pennsylvania
No Drawing. Filed Oct. 21, 1965, Ser. No. 500,361
15 Claims. (Cl. 260—2.5)

This application is a continuation-in-part of copending application Serial No. 256,845, filed February 7, 1963 now abandoned.

This invention relates to a method of preparing polyurethane foams and, more particularly, to a method of preparing phosphorus-containing polyurethane foams from stable premixes of masterbatches.

In application Serial No. 256,845, there is disclosed fire retardant polyurethane foams prepared from non-phosphorus containing polyether polyols, certain phosphorus-containing polyols and polyisocyanates containing about 2.3 to about 6 isocyanato groups per molecule.

It has been found, however, that when the polyols and blowing agent, as well as the usual additives are formed into a premix or masterbatch, the properties of this masterbatch tend to drift over a period of time. The instant invention relates to a method of stabilizing these masterbatches.

The non-phosphorus containing polyols which may be utilized in the compositions of this invention consist essentially of carbon, hydrogen and oxygen and preferably comprise oxyalkylation products of sucrose, fructose, glucose and sorbitol, containing at least 3 and usually 6 to 8 hydroxyl groups per molecule. Sucrose constitutes the preferred starting polyol for oxyalkylation. The oxyalkylation products usually have a hydroxyl number in a range of about 150 to about 700. Preferably, the oxyalkylation of a glycoside or saccharide is effected with an oxirane compound of relatively low molecular weight containing but a single oxirane ring and being represented by ethylene oxide, propylene oxide and butylene oxide. Butylene oxide, if used, may be either the 1,2 or the 2,3 oxide isomer. Obviously, mixtures of the 1,2 and 2,3-butylene oxide isomers could also be used in effecting the reaction. Styrene oxide may also be used to satisfy all of, or a part of, the requirements for oxirane compound.

The alkylene oxide or oxirane compound may be employed in a proportion in excess of equivalency with respect to the hydroxyl groups of the saccharide compound which is being oxyalkylated. For example, in the instance of sucrose, the ratio of alkylene oxide preferably is in a range of about 10 to about 30 moles per mole of sucrose, so that at least part of the ether chains formed will contain a plurality of oxyalkyl units. The preparation of such compounds is disclosed in detail in U.S. Patent 3,153,002 to Wismer et al., issued on October 13, 1964. The method consists essentially of dissolving the sucrose in a small amount of water, e.g., about 5 percent to about 17 percent of water, in a pressure container (such as an autoclave), and contacting the resultant solution with the alkylene oxide under pressure until a desired degree of oxyalkylation has been obtained. The reaction may be catalyzed with a base, such as sodium hydroxide, sodium carbonate or sodium acetate, the amount thereof being within a range of about 1 percent to about 10 percent. When oxyalkylation is completed, the water and any other volatile components present may be removed by evaporation.

The polyether polyol products of the references are characterized by viscosities in a range of about 2000 to about 400,000 centipoises, hydroxyl values in a range of about 250 to about 750, and molecular weights of about 700 to about 1800.

A second method of oxyalkylating sucrose is disclosed in U.S. Patent 3,085,085 to Wismer et al., issued April 9, 1963. According to the method disclosed in the latter, the sucrose is initially dissolved in a small amount of water, as disclosed in the first-mentioned application, and is then partially oxyalkylated, e.g., to the extent that about 6 moles of alkylene oxide are reacted with the hydroxyls of the sucrose, the water is then removed and further oxyalkylation is conducted to obtain side chains with a plurality of ether linkages, each chain being terminated by a hydroxyl broup.

In the instance of the preferred polyols, namely the oxalkylation products of sucrose, the polyether polyols may be represented by the formula:

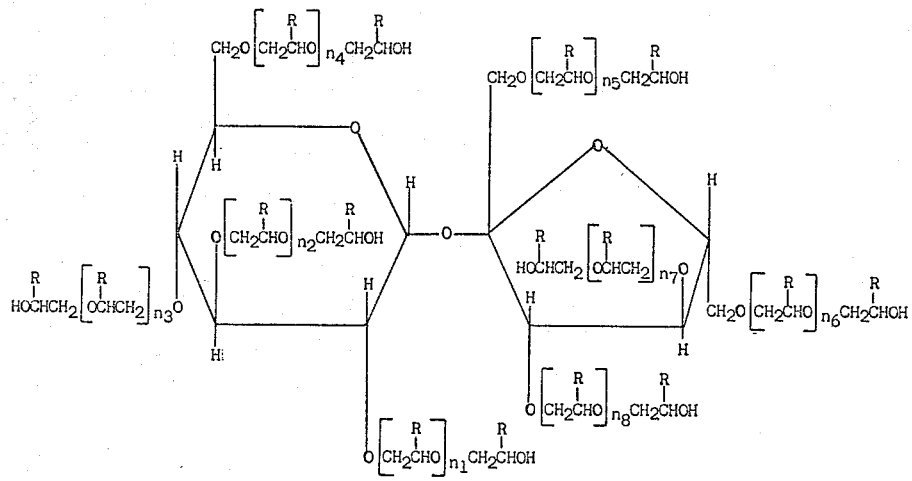

In the formula, R is —H or —CH$_3$, and $n_1$, $n_2$, $n_3$, $n_4$, $n_5$, $n_6$, $n_7$ and $n_8$ are whole numbers from 0 to 8 and their sums being in a range of about 2 to about 18, dependent upon the number of ethylene oxide, propylene oxide or 1,2-butylene oxide molecules introduced. The sucrose polyether polyols will normally have a hydroxyl number in a range of about 200 to about 600.

Similar techniques may be employed in the oxyalkylation of other saccharides, such as fructose, glucose or sorbitol, or mixtures thereof such as are represented in invert sugar, etc. Oxyalkylated starch or oxyalkylated cellulose may also be used. Mixtures of sucrose and glucosides such as methyl glucoside, may be used as the polyol component in the foams of this invention.

As described in application Serial No. 256,845, fire retardant foams can be obtained by incorporating certain phosphorus polyols with the above-described polyols. These phosphorus-containing polyols include those phosphorus polyols which are the oxyalkylation products of acids of phosphorus such as phosphorous acid, phosphoric acid, polyphosphoric acid and the like, including acid esters of phosphorus, such as those described hereinafter. These phosphorus polyols may be defined as oxyalkylation products of phosphorus compounds having at least one —OH group (acid group) attached to the phosphorus atom. These phosphorus polyols have hydroxyl values of about 150, or greater, although a hydroxyl number of at least about 200 is preferred when said phosphorus polyols are utilized in rigid foam formulations.

The acid esters of phosphorous may be prepared by reacting an alcohol with phosphoric acid per se or, preferably, the anhydride thereof. The preferred acid is ortho-phosphoric acid ($H_3PO_4$) or, better still, its anhydride ($P_2O_5$). However, the invention also includes the use of other acids containing the →P=O group or anhydrides thereof; these include:

Phosphorus acid ($H_3PO_3$)
Meta-phosphoric acid
Pyrophosphoric acid
Isophosphoric acid
Polyphosphoric acid and the oxides or anhydrides of these (where they exist), and being represented by $P_2O_5$, $P_2O_4$ and $P_2O_3$. The acid (or anhydride) is reacted with the alcohol component in conventional manner to provide an acid ester which may be either the monoester or the diester, and may be represented by the following formulae:

(I)

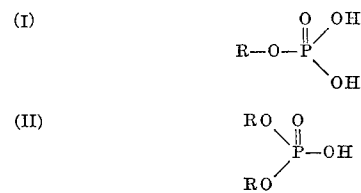

(II)

In the foregoing formulae, groups R are alkyl groups, alkoxyalkyl groups, aromatic (benzene) groups or hydroxy-benzene groups, and are conventionally represented by a lower alkyl group such as ethyl, methyl, propyl, isopropyl, isobutyl, tertiary butyl or amyl. It will be apparent that mixtures of the monoester and the diester may also be included. These esters still contain one or more acid —OH groups of phosphoric acid.

The phosphorus polyols may also be prepared by the interaction of mono-alcohols and glycols with phosphoric acid rather than with phosphorus pentoxide. This reaction does not occur as smoothly as with phosphorus pentoxide and more complex phosphate acidic esters are obtained.

The acids of phosphorus and acid esters of the alcohol and the phosphorus-containing acid may be reacted with alkylene oxide molecules, each containing a group (preferably single):

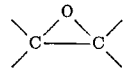

which may be termed an oxirane ring. Appropriate oxides comprise ethylene oxide, propylene oxide, butylene oxide (1,2 or 2,3) or styrene oxide. These oxides may be reacted under pressure with the acid ester above described. The material will usually be essentially neutral and will have a hydroxyl number in a range of about 150 to about 400.

The amount of alkylene oxide used in the oxyalkylation may be in a range of about 1 to about 12 moles per mole of acid ester of phosphoric acid.

In performing the oxyalkylation involved in the preparation of the phosphorus polyols, various embodiments of apparatus may be used, for example, the acid ester of phosphoric acid may be contained in a reaction vessel, such as a flask equipped with agitators, temperature controls and a feed for alkylene oxide, or preferably an autoclave, wherein the temperature of the reaction components and the rate of addition of alkylene oxide can be controlled. A preferred method of incorporating such phosphorus polyols in the polyurethane foam is to add the phosphorus polyol to a masterbatch which contains other polyols along with blowing agents, emulsifiers, catalysts and the like. A polyurethane foam is then formed by admixing the polyisocyanate component with the masterbatch.

Blowing agents which may be incorporated into the masterbatches include recognized systems for effecting the release of a gas in the foamable mixture wherein the polyurethane-forming mixture may be employed, for example, a small amount of water, e.g., about 1 percent to about 3 percent by weight based upon the reactive components of the foamable mixture, may be included in order to react with a portion of the isocyanato groups and thus to generate carbon dioxide in situ. If preferred, carbon dioxide may also be generated separately and whipped into the foamable mixture, or may be introduced therein by pressure or by a combination of whipping and pressure operations. When carbon dioxide under sufficient pressure is used, it goes into solution and when pressure is released, it separates as bubbles to provide a foam.

A preferable system of foaming comprises the addition to the polyurethane-forming mixture of a blowing agent, such as a chlorofluorocarbon represented by $CCl_3F$, $CCl_2F_2$ and others of this family, which can be incorporated in solution in the polyurethane-forming mixture and allowed to volatilize to effect blowing or foaming as the mixture exothermically cures.

Combinations of carbon dioxide and chlorofluorocarbon, e.g., about equal parts by volume of each, may be used. It is often preferred to cool the foamable mixture or the component thereof to which the blowing agent is added, to prevent premature volatilization of the latter. Temperatures of about 50° F. to about 60° F. in the liquid may be used to facilitate foaming. When urethane formation is initiated, the temperature rises exothermally to release the blowing agent before the mixture gels or sets.

The amount of blowing agent used will depend upon the density desired in the foam. This usually will be in a range of about 1 to about 10 pounds per cubic foot, through for special purposes, higher or even lower densities may be desired. In event that the blowing agent is a chlorofluorocarbon, about 5 percent to about 40 percent by weight based upon the foamable mixture may be used.

In addition to the foregoing main components, the reaction mixture employed in forming polyurethane resin foams may also include additives designed to promote the stability and cellularity of the foams obtained. For example, emulsifying amounts, e.g., about 0.1 percent to about 3 percent, of surfactants such as are conventionally employed in the formation of polyurethane foams may be included. Appropriate surfactants comprise the liquid silicone resins, such as Silicone 521. Silicone 521 is approximately of the formula:

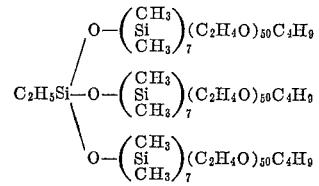

(United States Patent No. 3,034,996). Other surfactants may be employed to promote foaming, including the ionic and non-ionic emulsifiers, such as Tween 20, which is the polyoxyethylene sorbitan monopalmitate; Triton X-100, which is isooctylphenyl polyethoxyethanol, and others.

Likewise, additives designed to increase the stability of the foams optionally may be added, examples of the latter materials being cellulose ethers, such as methyl cellulose, and esters such as cellulose acetate butyrate and others which increase the toughness of the foams during the initial stages before the resin-forming components have had an opportunity to react to give more rigid structures.

The reactants forming a masterbatch may all be combined in a single stage without the intermediate formation of a so-called prepolymer of the polyol component(s) and the polyisocyanate. In the preparation of a foam by such technique, it is desirable to mix the polyether components, catalyst (if one is used), surfactant (if one is used), emulsifying agents and thickeners (if they are used) without the addition of the polyisocyanate component. Such mixtures, of course, so long as the polyisocyanate component is not present, are relatively stable. Upon the addition of the latter component, however, the mixture becomes immediately reactive and will foam and gel at once. Therefore, the polyisocyanate component is held in reserve until immediately before foaming and curing reaction is to be conducted. In other words, the foamable mixture is made up into two packages, A and B. Package B comprises the polyol and foam-producing agents, whereas the polyisocyanate constitutes package A. In some instances, certain of the components that are nonreactive with respect to the polyisocyanate, may also be included in package B.

In order to form polyurethane linkages between the polyol component or components and the polyisocyanate component in the resin-forming reaction, it is often preferable to include a catalyst material of urethane formation. Appropriate catalysts, when used, comprise:

Tetramethyl guanidine
Tetramethyl-1,3-butanediamine
Triethylenediamine (sold as DABCO)
Dimethylethanolamine Likewise, esters of tin, especially esters of tin and organic acids, such as:

Stannous oleate
Stannous octoate
Dibutyl tin dilaurate and others may be used. In those instances where large amounts of polyols containing tertiary amino groups or where a rapid reaction is not required, the catalyst component may be omitted. Catalysts, if employed, are preferably used in an amount of about 0.1 percent of about 5 percent by weight based upon the reactive components in the foamable mixture.

One difficulty which has been encountered in including the phosphorus polyols in the masterbatch is the instability which the phosphorus polyol contributes to the masterbatch. "Stability" is to be understood to be based upon the reactivity of the masterbatch as a function of time and temperature of storage. It has been observed that masterbatches containing phosphorus polyol in the reactive mixture will lose their activity. Often masterbatches containing the phosphorus polyols of this invention, which rapidly and efficiently foamed and cured when incorporated with a polyisocyanate, after storage for a short time, lost their activity and the mixtures to which they were added foamed and cured slowly and incompletely.

However, it has now been discovered that the addition of a stabilizing quantity of a tertiary amine containing hydroxyalkyl groups stabilizes a polyurethane foam masterbatch containing phosphorus polyols, particularly a phosphorus polyol which is slightly acidic and is derived from the oxyalkylation of acids of phosphorus or acid esters of phosphorus. The exact quantity of hydroxyalkyl-t-amine require to stabilize any particular masterbatch varies with the quantities and type of phosphorus polyol utilized. However, the quantity of hydroxyalkyl-t-amine necessary to stabilize a particular phosphorus polyol-containing masterbatch may be readily determined by preparing a few test batches containing various levels of hydroxyalkyl-t-amine, subjecting same to elevated temperatures and comparing storage stability at high temperatures with a masterbatch containing no hydroxyalkyl-t-amine and tested under similar conditions. Generally, to achieve a stabilizing effect, the hydroxyalkyl-t-amine is included in the masterbatch as at least about 10 percent by weight of the polyols present, although quantities of at least about 20 percent by weight of hydroxyalkyl-t-amine, based upon the total weight of polyols present, is preferred.

The amine polyols used to stabilize the masterbatches containing phosphorus polyols have the structure of polyols derived by reacting any primary, secondary or tertiary amine containing at least two active hydrogen atoms, usually amine hydrogen atoms or hydrogen atoms of hydroxyl groups with an alkylene oxide, preferably containing 2 to 4 carbon atoms such as ethylene oxide, propylene oxide and butylene oxide.

Preferably, such starting amines correspond to the formulas:

(I) 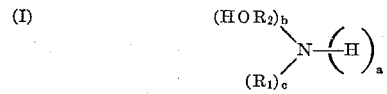

where $a$ and $b$ are whole numbers from 0 to 3 and $c$ is 0 or 1; $a+b+c$ equals 3; $a+b$ equals 2 or 3. Examples of such amines include ammonia, methyl amine, butyl amine, octyl amine, ethanol amine, propanol amine, octanol amine, diethanol amine, dibutanol amine, dioctanol amine, methyl ethanol amine, butyl propanol amine, methyl diethanol amine and ethyl dibutanol amine;

(II) 

(III) 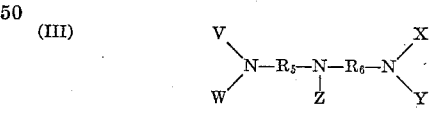

where V, W, X, Y and Z are selected from —H, —R, or —HOR$_2$. In the above formulas, R$_1$, R$_2$, R$_3$, R$_4$ and R$_5$ are aliphatic hydrocarbon groups, preferably containing 1 to 10 carbon atoms.

Thus, if ethylene-diamine is reacted with propylene oxide, a material with the structure:

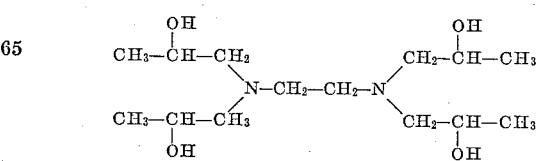

results, which is available commercially under the trade name of "Quadrol."

The reaction of diethylenetriamine with propylene oxide produces a material which is described below:

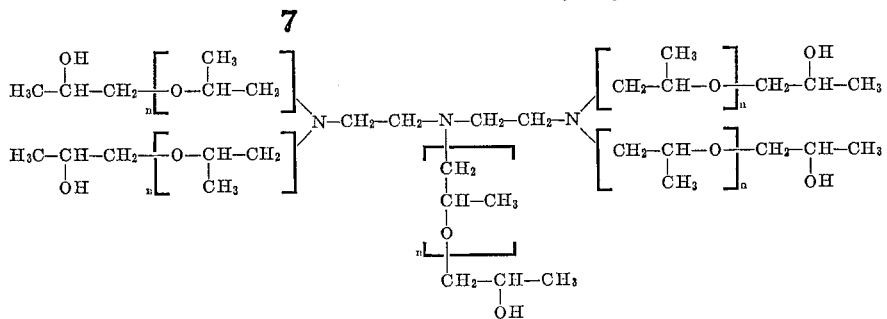

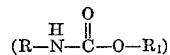

wherein n is a number which may be from 0 to about 5.

Triethanolamine reacted with propylene oxide produces an amine as follows:

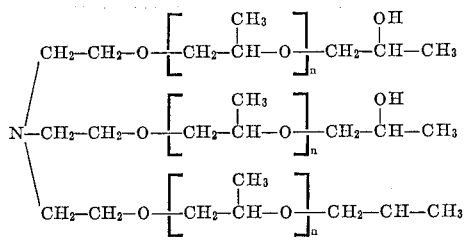

wherein n is a number from 0 to about 5. The polyols containing tertiary amino groups and having hydroxyl numbers in a range between about 200 and about 800 are preferred.

The aminic polyols show some marked stabilizing effect in amounts as low as about 3 percent based on the total foamable mixture; however these masterbatches still tend to drift in properties, although significantly more slowly, in fact, slowly enough to make the masterbatch useful over a period of time. Thus, the polyols may be used in amounts of about 3 percent to about 60 percent by weight based on the total foamable mixture, which usually is at least about 10 percent to about 80 percent by weight of the polyol components.

In order to achieve masterbatches which are essentially stable over a period of several weeks or even months or longer, to the extent that they may be used to produce quality foams, it is preferred to use an amount of aminic polyol that is about 25 percent to about 60 percent by weight of the polyol components, as illustrated in the examples.

The polyurethane foams are prepared from the masterbatch by using a so-called "one-shot system," in which the polyisocyanate component, having been kept separately from polyol components (including the phosphorus polyol), is added to the preformed masterbatch mixture, including blowing agent, as rapidly as practicable. The mixture is then allowed to foam and cure. The total of the polyisocyanate will usually approximate equivalency with respect to the active hydrogen atoms in the mixture and usually is represented by the hydrogen atom of the hydroxyl groups.

While all the polyisocyanates conventionally used to prepare polyurethane foams may be reacted with the master-batches of this invention in order to form fire retardant forms, the polyisocyanato component used in forming the foams should contain about 2.3 to about 6 isocyanato (N=C=O) groups per molecule. These values manifestly constitute average values within the molecule. Doubtless, some molecules may contain only 2 isocyanato groups, while others may contain 4 or 6. The average, in most instances, will fall within the range of 2.4 to about 3.5. It is characteristic of the preferred polyisocyanato component as herein used that it does not contain any appreciable number of preformed urethane $$(R-N(H)-C(=O)-O-R_1)$$

linkages in the average molecule. Therefore, it is substantially different from so-called prepolymers which, although they may contain some molecules with 3 or even more isocyanato groups per molecule, are characterized by the presence of such linkages in such molecules, the linkages being formed by reaction of hydroxyl groups of the polyol with a part of the isocyanato groups in well-known manner. Such prepolymers are not satisfactory for use in preparing fire retardant from the instant masterbatches.

The polyisocyanato component preferably employed in the practice of the present invention may be represented by the formula:

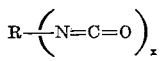

wherein R is usually hydrocarbon and may be a chain-like hydrocarbon comprising methyl, ethyl, propyl or aralkyl groups in various arrangements, and $x$ is a number as aforesaid having an average value in a range of about 2.3 to about 6, representing the number of isocyanato groups replacing hydrogen in the hydrocarbon portion of the molecule.

Examples of such polyisocyanato compounds that may be used comprise diphenyl methane diisocyanate, often designated for brevity as MDI, which in spite of its name, actually has an isocyanato functionality of about 2.5 and therefore must contain a considerable number of molecules, such as:

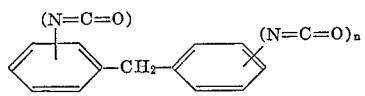

wherein $n$ has a value of at least 1.4. In some instances, $n$ may even be 3. Suitable branched polyisocyanates which may be used as the polyisocyanato components in the practice of this invention may also be aralkyl polyisocyanates that correspond to those of United States Patent No. 2,683,730 to Seeger et al. These polyisocyanato compounds are represented by the generalized formula:

$$O=C=N-(CY_2R'-N=C=O)_n$$

wherein R and R' are arylene radicals, Y is selected from the group consisting of hydrogen, alkyl and aryl radicals, and $n$ is a number which, in accordance with the provisions of the present invention, should be within a range of about 1.3 to 3.5 or 4. One such compound may be represented by the formula:

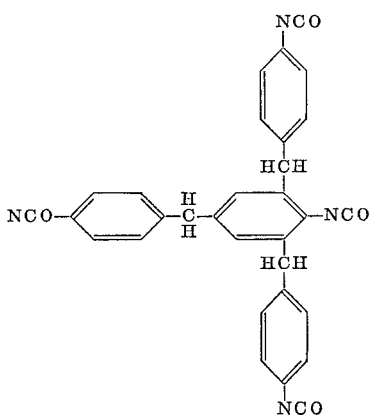

Methods of preparing such isocyanato compounds are adequately described in the aforementioned patent.

Linear aralkyl polyisocyanato compounds wherein the hydrocarbon portion of the molecule is linear or straight chain and comprise alternating aryl and alkylene groups, are represented by the commercial material sold under the trade name of PAPI. These compounds may be designated by the structural formula:

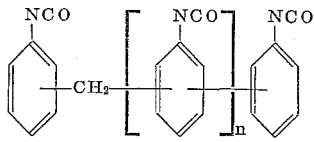

wherein $n$ is a small number, e.g., 1 to 4. The material is termed "polymethylene polyphenylisocyanate." The average molecular weight usually is within a range of 380 to 400. The isocyanate equivalent is 135 maximum and the functionality averages approximately 3 or slightly above. Therefore, it may be considered that $n$, on the average, is approximately 1.

Other isocyanato compounds which are free of urethane and urea linkages, which are of an isocyanato equivalency in excess of 2.3 and which therefore may be used in the practice of the invention, comprise:

1,2,4-Benzene triisocyanate
1,2,2-Triisocyanato butene
1,3,3-Pentane triisocyanate
1,2,4-Butane triisocyanate
Triphenylmethane triisocyanate These polyisocyanates may be used singly or in a mixture with each other, or with some addition of a diisocyanate such as:

Toluene diisocyanate
Diphenyl diisocyanate
Triphenyl diisocyanate
Chlorophenyl-2,4-diisocyanate
Ethylene diisocyanate
1,4-Tetramethylene diisocyanate
P-phenylene diisocyanate
Hexamethylene diisocyanate
3,3'-Dimethyl-4,4'-biphenylene diisocyanate
3,3-Dimethoxy-4,4'-biphenylene diisocyanate
Polymethylene polyphenylisocyanate
Diphenylmethane-4.4'-diisocyanate Presently preferred polyisocyanato compounds comprise polymethylene polyphenylisocyanate (PAPI), methylene diisocyanate (MDI), which as previously explained, actually has an isocyanato functionality of about 2.5 and therefore contains a substantial number of molecules containing 3 or more isocyanato groups.

The following consitute suggested ranges of properties and proportions of the several components of the foamable mixtures.

|  | Minimum | Maximum |
|---|---|---|
| Polyether polyol (hydroxyl number) | 300 | 750 |
| Hydroxy phosphoryl esters (fire retardant), percent | 3 | 20 |
| Hydroxyalkylamine, percent | 3 | 60 |
| Blowing agent (chlorofluorocarbon), percent | 5 | 20 |
| Surfactant, percent | 0.005 | 3 |
| Catalyst, percent | 0 | 3 |
| Polyisocyanate/Polyol Index | | |
| Polyisocyanate | 0.9 | 1.3 |

It will be understood that the foregoing ranges of proportions are representative. In some instances, the proportions may be outside of the foregoing limits.

The mixing of the components of the foamable compositions may be effected with various agitating devices, such as a conventional turbo-mixer. The mixture is introduced into a mold or is applied to a support. The exothermal rise in the mixture is usually adequate to volatilize the blowing agent and cure the mixture, but if the foam body is thin, it is not precluded to apply additional heat to speed up the process.

While it is often possible to purchase acid esters of the phosphorus-containing acids as commercial products and then to react them with alkylene oxide to provide a substantially neutral ester, it will be understood that some of these may not at present be available and for that reason, it may sometimes be desirable for the user to make up the acid esters in his own plant. The following examples illustrate the preparation of typical acid esters of oxy-acids of phosphorus which may further be subjected to reaction with an alkyene oxide to provide hydroxyphosphoryl esters that may subsequently be used as fire retardant agents in the polyurethane resin foams. All parts and percentages throughout the specification are by weight unless otherwise specified.

EXAMPLE I

This example illustrates the oxyalkylation of an acid ester of phosphoric acid wherein the acid ester employed was that obtained by reacting a charge comprising:

| | Moles |
|---|---|
| $H_3PO_4$ | 3.09 |
| $P_2O_5$ | 1.0 |
| Ethylene glycol | 2.68 |

The acid value of the product was 808 and the phosphorus content was 27.68 percent.

In order to form an oxyalkylation product of this material, a charge was prepared comprising:

| | Grams |
|---|---|
| Acid ester (as above described) | 950 |
| Propylene oxide | 1840 |

In the reaction, the acid ester was charged into a reactor and was heated to 150° F. The propylene oxide was added at a rate to maintain a reasonable pressure in the system, the system being cooled to maintain a temperature below about 236° F. The reaction was continued for six hours and 48 minutes. The reaction product was subjected to stripping to remove any unreacted propylene oxide. A yield of 2143 grams was obtained having the following characteristics:

| | |
|---|---|
| Acid value | 3.25 |
| Hydroxyl number | 343.8 |
| Phosphorus content, percent | 10.05 |

This product was suitable for use as a fire retardant in a polyurethane foam wherein the isocyanato component was of a functionality above 2.3 and was substantially free of urethane linkages.

EXAMPLE II

This example is illustrative of the oxyalkylation of the acid phosphate obtained by reacting a mixture comprising:

| | Moles |
|---|---|
| $P_2O_5$ | 1 |
| Propylene glycol | 1 |
| n-Butanol | 1.82 |

The acid value of this product was 535. In order to form an oxyalkylation product, a total charge comprising:

| | Grams |
|---|---|
| Acid ester | 1050 |
| Propylene oxide | 1212 | was used. The acid ester was introduced into a reactor, was heated to 150° F., and the addition of propylene oxide was initiated. The temperature of reaction was maintained below about 230° F. and was continued for a period of 3 hours and 36 minutes. The maximum pressure during the reaction was about 32 pounds.

The crude product was of an acid value of 2.9. It was stripped under vacuum at a temperature up to 100° C. An oxyalkylation product was obtained, having the following characteristics:

| | |
|---|---|
| Acid value | 0.3 |
| Hydroxyl number | 297.4 |
| Phosphorus content, percent | 10.44 |

This product was also suitable for use as a fire retardant agent when used in a foam wherein the isocyanato component was of a functionality above 2.3 and was substantially free of urethane linkages.

EXAMPLE III

In accordance with the provisions of this example, an acid ester of ethylene glycol and n-butanol was prepared by reaction with phosphorus pentoxide, the charge comprising:

| | Moles |
|---|---|
| Ethylene glycol (78.5 lbs.) | 1.26 |
| n-Butanol (187 lbs.) | 2.55 |
| Phosphorus pentoxide (180 lbs.) | 1.26 |

This mixture was reacted to provide 400 pounds of a product of the following characteristics:

| | |
|---|---|
| Acid value | 516 |
| Phosphorus content, percent | 19.4 |

A portion of the resultant mixed acid ester was then further oxyalkylated in the reactor, the total charge comprising:

| | Pounds |
|---|---|
| Acid ester (as above) | 71 |
| Propylene oxide | 70.5 |

The resultant product was of the following characteristics:

| | |
|---|---|
| Acid value | 3.89 |
| Hydroxyl number | 295.6 |
| Phosphorus content, percent | 10.85 |

When used in accordance with the provisions of this invention, this material was a good fire retardant for polyurethane foams.

EXAMPLE IV

The acid ester of this example was the mono-di-n-butyl acid phosphate obtained by reacting:

| | Pounds |
|---|---|
| n-Butyl alcohol | 37.2 |
| Phosphorus pentoxide | 17.8 |

The phosphorus pentoxide was incorporated in six additions. The total reaction time was 4 hours and 52 minutes. The acid number of the resultant ester was 464. This acid ester was then oxyalkylated, the reaction charge comprising:

| | Pounds |
|---|---|
| Mono-di-n-butyl acid phosphate | 45.5 |
| Propylene oxide | 41.5 |

The acid ester was heated to a temperature of 150° F. and the propylene oxide was added at such rate as would permit control of the reaction. The total reaction time was six hours, at the conclusion of which the mixture was vacuum stripped to remove unreacted propylene oxide. A final yield of 66 pounds was obtained, the product having an acid value of 0.17 and an OH value of 278.5.

The fire retardancy of this material, when used in a one-shot foam with a non-urethane polyisocyanate having an isocyanato functionality above about 2.3, was very good.

The following examples are illustrative of the preparation of hydroxyalkyl phosphoryl esters of low acid value by a single stage reaction of the alkylene oxide with phosphoric acid. These have fire retardant properties when used in preparing polyurethane foams wherein the isocyanato component is non-urethane and has a functionality of 2.3 or more. However, the foams are of substandard quality in other respects in that the volume is poor and they remain tacky and uncured even over long periods of time.

EXAMPLE V

This example illustrates the preparation of an ester of phosphoric acid by reaction of ortho-phosphoric acid with propylene oxide without the intermediate reaction of the acid (or its anhydride) with an alcohol. In accordance with the provisions of the present example, a total charge was prepared comprising:

| | Grams |
|---|---|
| Phosphoric acid (85 percent) | 228 |
| Propylene oxide | 1044 |

The phosphoric acid was charged into a 3-liter, 4-necked flask equipped with a dropping bottle, thermometer, a Dry Ice condenser and a stirrer. The temperature was maintained by means of a water bath within a range of about 25° C. to about 32° C. The propylene oxide was added dropwise and the reaction was continued for a period of about 10 hours and 55 minutes. The reaction product was stripped to remove any unreacted propylene oxide. The resultant product was obtained in a yield of 97.6 percent. The product had the following characteristics:

| | |
|---|---|
| Hydroxyl number | 212 |
| Acid value | 2.41 |
| Phosphorus content, percent | 5.03 |

The molar ratio of alkylene oxide to phosphoric acid in the final product was 9 to 1.

EXAMPLE VI

*PAPI "one shot" masterbatch system*

This example is illustrative of the invention wherein a stable masterbatch comprising polyether polyol, hydroxyalkyl phosphate, hydroxyalkyl polyamine stabilizer, blowing agent, catalyst of urethane formation, and emulsifier were all made up into a stable, storage mixture which can be marketed to the foam manufacturer. The latter, when he is ready to make a foam, has only to add polyisocyanate, free of urethane linkages and having a functionality of 2.3 to 6. This final mixture will foam and cure without added heat to provide a fire retardant foam. This stabilizing effect is attained by adding to the masterbatch a hydroxyalkylamine of an appropriate hydroxyl number, e.g., 150 to 700, obtainable by reacting an amine, such as ethylenediamine, diethylenetriamine, triethylenetetramine or other polyalkyl polyamine, with an alkylene oxide, such as propylene oxide, ethylene oxide or butylene oxide. This hydroxyalkylpolyamine is added to the masterbatch in an amount of about 5 percent to about 60 percent by weight based upon the foamable mixture. The hydroxyalkylpolyamine, when used in a masterbatch, has the effect of preserving the activity of the catalyst.

In accordance with the provisions of this example, the polyisocyanato component was a commercial product sold as PAPI, which is polyethylene polyisocyanate of an isocyanato functionality in excess of 2.5 per molecule. It could be replaced by other polyisocyanates free of urethane linkages and having sufficient functionality. The foam composition was a so-called "one-shot" system wherein the polyisocyanate was employed as one component or package of the system. This component was mixed with the other components to form a foamable mixture. In the data tabulated to follow in this example, polyisocyanate indicates PAPI. The sucrose polyol was of 1 mole of sucrose, 11 moles of propylene oxide and 4 moles of ethylene oxide. The phosphorus polyols were, respectively, from Examples I, II, III and IV. The surfactant was a silicone surfactant which was soluble in the mixture which is an organo-silicone block copolymer having a formula:

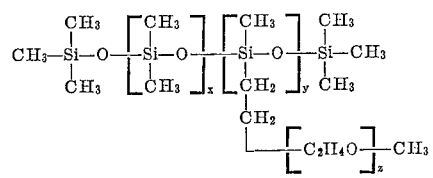

being a soft wax, having a melting point of 32° C.–35° C., a viscosity of 200–400 centistoke, a cloud point (1 percent water solution) of 64° C., and a specific gravity of 1.07 (35°/35° C.).

The catalyst was a mixture of the foregoing sucrose polyether polyol (4 parts by weight) and DABCO (1 part by weight). This catalyst could be replaced by other of the catalysts herein disclosed, for example, tin catalysts such as dibutyl tin dilaurate, in an amount of 0.1 percent to 5 percent by weight based upon the final foamable mixture.

The masterbatch comprising all components of the foamable mixture except the polyisocyanate, could be stored and shipped as a commercial article. When it was to be used, it was only necessary to add polyisocyanate free of urethane linkages and agitate, for example, for about 15 seconds, upon a turbo-mixer.

The foamable mixtures were foamed and cured without extraneous heat, and were cut into samples which were subjected to humid aging for periods of 1 week, 2 weeks and the tendency of the foam samples to expand under humid aging were observed. Additional sets of samples after humid aging were subjected to flame tests in accordance with the provisions of ASTM-1692-59T.

A number of examples of such stabilized masterbatches and the final foam compositions embodying the same, as well as the test data of the foams prepared therefrom, are subsequently presented in tabular form (Table III).

It will be observed from the data of Table III that the foams obtained were of good structure and appearance. Also, they were of low density, yet were strong and non-friable. The foams were also non-tacky. The foams withstood humid aging but with slight expansion. Also, the foams after humid aging, even after maximum periods of time (4 weeks), were still self-extinguishing often after a lapse of but a few seconds burning time.

Run A (control)

This run constitutes a control wherein the masterbatch comprising the polyols and the catalyst of polyurethane reaction, was formulated without the use of a stabilizing hydroxyalkylamine.

The non-phosphorus polyol component was essentially (89 parts) the oxyalkylation product of one mole of sucrose, 11 moles of propylene oxide and 4 moles of ethylene oxide to which had been added 5 parts of trimethylolpropane and 6 parts of the oxyalkylation product of trimethylolpropane and propylene oxide, said oxyalkylation product being of a hydroxyl value of 740. The emulsifying agent which was included in the masterbatch comprising the liquid silicone resin surfactant previously referred to. The fire retardant agent substantially corresponded to Example IV.

The catalyst comprised a solution of 1 part of tertiary amine (DABCO) in 4 parts of a solvent, which was the oxyalkylation product of 1 mole of sucrose, 11 moles of proyplene oxide and 4 moles of ethylene oxide. The masterbatch comprised:

| | Parts by weight |
|---|---|
| Non-phosphorus poylol | 75.5 |
| Emulsifier (organopolysiloxane) | 1 |
| Phosphorus polyol (fire retardant) | 15 |
| Catalyst solution | 4 |
| $CCl_3F$ (blowing agent) | 30 |

A part of this masterbatch or premix was then made up into the following foamable mixture:

| | Parts by weight |
|---|---|
| Polyisocyanate (PAPI) (at room temperature) | 100 |
| Premix (at 60° F.) | 125.5 |

The components were stirred and poured into a mold, and allowed to foam and set. The cream time of the mixture

TABLE III.—PAPI "ONE SHOT" SYSTEM (STABILIZED)

| Composition | Foam 1 | Foam 2 | Foam 3 | Foam 4 |
|---|---|---|---|---|
| Polyisocyanate (PAPI) | 100.0 at 75° F. | 100.0 at 75° F. | 100.0 at 75° F. | 100.0 at 75° F. |
| Masterbatch: | | | | |
| Sucrose polyol | 54.7 | 54.5 | 52.2 | 54.5 |
| Hydroxyalkylamine [1] | 20.0 | 20.0 | 20.0 | 20.0 |
| P. polyol (Example IV) | 20.5 | | | |
| P. polyol (Example III) | | 20.5 | | |
| P. polyol (Example I) | }60° F. | }60° F. | 20.5 }60° F. | 20.5 }60° F. |
| P. polyol (Example II) | | | | 20.5 |
| Surfactant | 1.0 | 1.0 | 1.0 | 1.0 |
| Catalyst | 3.5 | 3.5 | 3.5 | 3.5 |
| Blowing agent | 32.4 | 32.4 | 32.0 | 32.4 |
| Cream time | 26 sec | 25 sec | 23 sec | 22 sec. |
| Set time | 52 sec | 50 sec | 48 sec | 49 sec. |
| Foam appearance | Good | Good | Good | Good. |
| Color | Light Brown | Light Brown | Light Brown | Light Brown. |
| Cell structure | Fine | Fine | Fine | Fine. |
| Strength | Strong, not friable | Strong, not friable | Strong, not friable | Strong, not friable. |
| Density, lbs./cu. ft | 1.99 | 1.94 | 1.90 | 1.94. |
| Initial fire test | 1"–34 sec. flame out | 1⁵⁄₁₆"–33 sec. flame out | 1"–36 sec. flame out | 1"–34 sec. flame out. |
| 1 week at 158° F. H.A.[2] | 1"–26 sec | 1"–27 sec. flame out | 1"–22 sec | 1⁵⁄₁₆"–28 sec. flame out. |
| | 1¼"–30 sec. SE[3] | | 1¼"–27 sec. SE | |
| 2 weeks at 158° F. H.A. | 1"–24 sec | 1"–27 sec | 1"–20 sec | 1"–23 sec. |
| | 1¼"–30 sec. SE | 1¼"–32 sec. SE | 1½"–31 sec. SE | 1¼"–32 sec. SE. |
| 4 weeks at 158° F. H.A. | 1"–25 sec | 1"–24 sec | 1"–21 sec | 1"–19 sec. |
| | 1¼"–30 sec. SE | 1¼"–30 sec. SE | 1⁷⁄₁₆"–28 sec. SE | 1⁵⁄₁₆"–30 sec. SE. |

REMARKS

| | | | | |
|---|---|---|---|---|
| 1 week at 158° F. H.A. | ⅛" expansion, very slight discolor. | ⅛" expansion, very slight discolor. | ⅛" expansion, very slight discolor. | ⅛" expansion, very slight discolor. |
| 2 weeks at 158° F. H.A. | ⅛" expansion, very slight discolor. | ¼" expansion, very slight discolor. | ¼" expansion, very slight discolor. | ¼" expansion, very slight discolor. |
| 4 weeks at 158° F. H.A. | ³⁄₁₆" expansion, slight discolor. | ⅛" expansion, very slight discolor. | ³⁄₁₆" expansion, slight discolor. | ¼" expansion, slight discolor. |

[1] Hydroxyalkylamine=Diethylenetriamine and propylene oxide, OH value 475 (this component is optional for flame retardancy, but necessary for masterbatch stability).
[2] H.A.=Humid aging at 100 percent relative humidity.
[3] SE=Self-extinguishing.

The following runs were also conducted to demonstrate the stabilizing effect of the hydroxyalkylamine component on a masterbatch system comprising the phosphorus containing polyol, the non-phosphorus polyol and the catalyst of polyurethane reaction.

was 28 seconds and the set time was 65 to 68 seconds. The composition comprising the unaged masterbatch and the polyisocyanate provided a good foam having a fine cellular structure.

A second portion of the masterbatch was subjected to aging at 110° F. for 24 hours. The masterbatch was then incorporated with the same polyisocyanate in the same proportions and the mixture was poured into a mold. The cream time of this mixture was 130 to 140 seconds, and the mixture did not set. It was obvious that this mixture could not be foamed and cured satisfactorily, and the product was discarded without having cured. The masterbatch or premix was apparently unstable.

*Run B*

The components of the foamable mixture in this run were the same as those of the preceding run, except that the masterbatch component was stabilized with a hydroxyalkyl polyamine which was the oxyalkylation product of diethylenetriamine and propylene oxide, having a hydroxyl value of 700 and sold under the trade name LA–700. The masterbatch or premix comprised:

|  | Parts by weight |
|---|---|
| Non-phosphorus polyol (same as in Run A) | 41.5 |
| Fire retardant phosphorus polyol (same as Example IV) | 15 |
| Hydroxyalkylamine (LA–700) | 20 |
| Emulsifier (organopolysiloxane) | 1 |
| CCl₃F (blowing agent) | 32 |

One portion of this masterbatch or premix was incorporated with polyisocyanate (Mondur MR) to provide a foamable composition comprising:

|  | Parts by Weight | Temperature, °F. |
|---|---|---|
| Polyisocyanate (Mondur MR) | 100 | 75 |
| Premix | 109.5 | 60 |

The components were stirred together and subjected to foaming and curing at once. Other portions were subjected to aging at 110° F. for varying periods in order to determine the stability of the mixtures. The results obtained are tabulated as follows:

| Aging of Masterbatch | Cream Time (seconds) | Set Time (seconds) | Remarks |
|---|---|---|---|
| Unaged | 45–50 | 84–87 | Good foam, fine cells. |
| 17 hours | 47–51 | 82–86 | Do. |
| 3 days | 47–52 | 84–89 | Do. |
| 8 days | 52 | 85–95 | Do. |
| 15 days | 60 | 88–98 | Do. |
| 22 days | 58–65 | 104–107 | Do. |
| 30 days | 60–70 | 100–110 | Do. |
| 62 days | 60–70 | 105–115 | Do. |

The aging tests for the master batch were concluded at the end of 62 days and the foams were still of good structure. It was apparent that the hydroxyalkyl polyamine was a highly effective stabilizer of the masterbatch components.

*Run C*

In a repetition of Run B, a masterbatch was prepared comprising:

|  | Parts by weight |
|---|---|
| Non-phosphorus polyol (same as Run A) | 41.5 |
| Hydroxyalkylamine (LA–700) | 20.0 |
| Catalyst mixture (same as Run A) | 0.4 |
| Fire retardant phosphorus polyol (same as Example IV) | 15.0 |
| Surfactant (organopolysiloxane) | 1.0 |
| CCl₃F (blowing agent) | 32.0 |

One portion of this masterbatch was made up into a foamable mixture comprising:

|  | Parts by Weight | Temperature, °F. |
|---|---|---|
| Mondur MR | 100 | 75 |
| Unaged masterbatch | 109.9 | 60 |

The two components (masterbatch and Mondur MR) were agitated together, were poured into a mold and foamed.

Other portions of the same masterbatch were subjected to aging at 110° F. for varying periods. The aged samples were then formulated with polyisocyanate (Mondur MR) in the foregoing manner and the mixtures were foamed and cured. The characteristics of the several foams are tabulated as follows:

| Time of Aging of Masterbatch | Cream Time (seconds) | Set Time (seconds) | Remarks |
|---|---|---|---|
| Unaged | 35–40 | 60–62 | Good foam. |
| 1 day | 35–40 | 67–71 | Do. |
| 3 days | 37–43 | 72–77 | Do. |
| 25 days | 52 | 89–93 | Do. |

*Run D*

The masterbatch of this run comprised:

|  | Grams |
|---|---|
| Non-phosphorus polyol (containing oxyalkylated amine) | 77 |
| Emulsifier (organopolysiloxane) | 1.5 |
| Fire retardant phosphorus polyol | 15 |
| Hydroxyalkylamine (LA–475) | 5 |
| Catalyst (dibutyl tin dilaurate) | 0.2 |
| CCl₃F (blowing agent) | 39 |

LA–475 is the oxyalkylation product of diethylenetriamine and propylene oxide having a hydroxy value of 475. The hydroxyalkylamine provided greater stability of the masterbatch than otherwise would have been obtained. It also functioned as an amine catalyst.

To form a foamable mixture, a composition was prepared comprising:

|  | Parts by weight |
|---|---|
| Polyisocyanate (PAPI) | 105 |
| Masterbatch | 137 |

A sample was made up into a foamable mixture before aging of the masterbatch, while other samples of masterbatch were subjected to aging at 110° F. over varying periods of time, and the masterbatch samples were then incorporated with the polyisocyanate and the mixtures were foamed. The results are as follows:

| Time of Aging of Masterbatch | Cream Time (seconds) | Set Time (seconds) | Remarks |
|---|---|---|---|
| Unaged | 53 | 78 | Good foam. |
| 4 days | 55 | 81–82 | Do. |
| 8 days | 60 | 99–110 | Do. |
| 4 weeks | 60 | 100–110 | Do. |

It was aparent that the use of the non-phosphorus polyol and the hydroxyalkylamine (LA–475) acted as a stabilizer in the masterbatch and was effective in increasing the storage life of said masterbatch.

*Run E*

Two masterbatches were prepared comprising:

|  | Parts by Weight | |
|---|---|---|
|  | E-1 | E-2 |
| Non-phosphorus polyol (Same as Run A) | 19.0 | 52.2 |
| Phosphorus polyol (Same as Example IV) | 30.0 | 30.0 |
| Aminic polyol (LA–475) | 41.0 | 7.8 |
| Surfactant (organopolysiloxane) | 1.5 | 1.5 |
| Catalyst (tetramethyl butane diamine) | 0.8 | 1.6 |
| Blowing agent (CCl₃F) | 33.0 | 33.0 |

The above masterbatches were formulated with 100 parts of Mondur MR and mixed for 10 seconds.

A portion of the masterbatch was aged for two weeks and then similarly formulated. The properties were compared:

|      | Cream Time (Seconds) || Set Time (Seconds) ||
|------|---------|-------|---------|---------|
|      | Initial | Aged  | Initial | Aged    |
| E-1  | 25      | 33    | 54      | 50–60   |
| E-2  | 27      | 75–80 | 69      | 163–165 |

From this example it can be seen that while relatively small amounts of the aminic polyol improve stability significantly, amounts within the preferred range impart measurably greater stability.

In those masterbatches wherein a hydroxyalkyl polyamine is employed as a stabilizer, an important advantage resides in the fact that the masterbatch and the isocyanato component may be applied as coatings upon a surface by spray application. The sprayed mixtures will then foam and cure in situ.

It is within the purview of the invention to employ the hydroxyalkyl phosphate and the hydroxyalkyl polyamine as the sole polyol components in the masterbatch.

Although specific examples of the invention have been set forth hereinabove it is not intended to limit the invention thereto, but to include all of the variations and modifications falling within the scope of the appended claims.

What is claimed is:

1. A stabilized masterbatch suitable for incorporation with an organic polyisocyanate to form a fire-retardant, cellulated polyurethane, said masterbatch comprising:
   (A) a polyol which is the reaction product of:
      (1) a polyhydroxy compound containing about 3 to about 8 hydroxyl groups per molecule, with
      (2) an alkylene oxide,
   (B) a phosphorus-containing polyol resulting from reacting:
      (1) an alkylene oxide containing from about 2 to about 6 carbon atoms per molecule, with
      (2) an acid of phosphorus having at least one OH group attached to the phosphorus atom;
   (C) a stabilizing amount of polyhydroxyalkyl amine which has the structure of the reaction product of an amine containing at least two active hydrogen atoms with an alkylene oxide containing 2 to 4 carbon atoms per molecule, said polyhydroxyalkyl amine being the sole stabilizer added to the mixture;
   (D) a blowing agent for cellulation of polyurethane resin, and
   (E) a catalyst of urethane formation.

2. The stabilized masterbatch of claim 1 wherein the catalyst of urethane formation is an organic ester of tin.

3. The stabilized masterbatch of claim 1 wherein the catalyst of urethane formation is an amine.

4. The stabilized masterbatch of claim 1 wherein the polyhydroxy alkyl amine is present in an amount of at least about 25 percent by weight of the polyol components.

5. The stabilized masterbatch of claim 1 wherein the phosphorus-containing polyol results from reacting:
   (A) an alkylene oxide containing 2 to about 6 carbon atoms per molecule, with
   (B) an acid ester of:
      (1) a material selected from the class consisting of an oxyacid of phosphorus and its anhydride, and
      (2) an alcohol containing from 1 to 4 hydroxyl groups per molecule.

6. The stabilized masterbatch of claim 5 wherein the polyhydroxyalkyl amine is the reaction product of an amine having at least two active hydrogen atoms and an alkylene oxide containing from 2 to 4 carbon atoms per molecule and has a hydroxyl number of about 200 to about 800.

7. The stabilized masterbatch of claim 5 wherein the blowing agent is chlorofluorocarbon.

8. The stabilized masterbatch of claim 5 wherein the catalyst of urethane formation is an organic ester of tin.

9. The stabilized masterbatch of claim 5 wherein the polyhydroxyalkyl amine is present in an amount of about 25 percent by weight of the polyol component.

10. The stabilized masterbatch of claim 9 wherein the polyhydroxyalkyl amine is the oxyalkylation product of diethylene triamine and propylene oxide.

11. The stabilized masterbatch of claim 9 wherein the polyhydroxyl amine is the oxyalkylation product of ethylene diamine and propylene oxide.

12. The stabilized masterbatch of claim 9 wherein the polyhydroxyl amine is the oxyalkylation product of triethanol and propylene oxide.

13. The stabilized masterbatch of claim 9 wherein the catalyst of urethane formation is an amine.

14. The stabilized masterbatch of claim 5 wherein the alcohol (B) (2) is a monohydric alkanol.

15. The stabilized masterbatch of claim 14 wherein the polyol (A) is a sucrose polyether polyol corresponding to the formula:

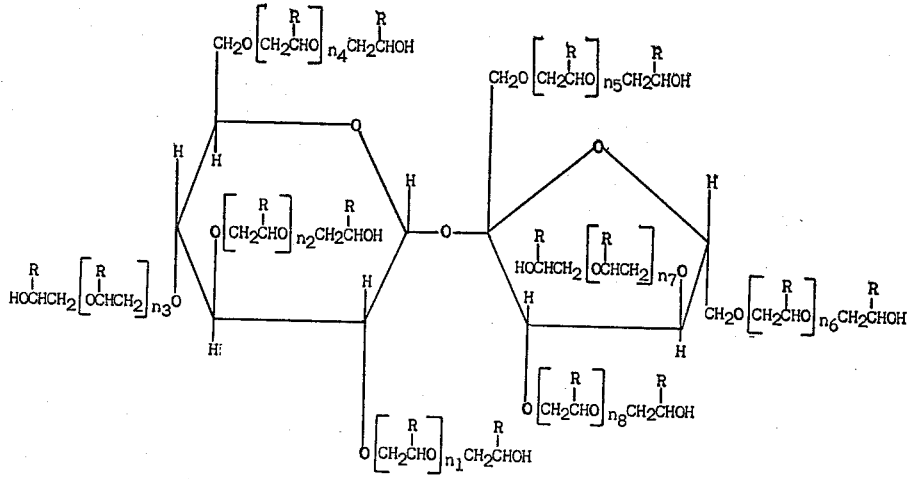

wherein R is —H or —$CH_3$, and $n_1$, $n_2$, $n_3$, $n_4$, $n_5$, $n_6$, $n_7$, and $n_8$ are whole numbers from 0 to 8, and their sums are in a range of about 2 to about 18.

(References on following page)

References Cited by the Examiner

UNITED STATES PATENTS

| | | | |
|---|---|---|---|
| 3,072,582 | 1/1963 | Frost | 260—2.5 |
| 3,134,742 | 5/1964 | Wismer et al. | 260—2.5 |
| 3,137,662 | 6/1964 | Recktenwald | 260—2.5 |

FOREIGN PATENTS 598,678   1/1961   Belgium.

LEON J. BERCOVITZ, *Primary Examiner.*

J. J. KLOCKO, G. W. RAUCHFUSS,
*Assistant Examiners.*